(12) United States Patent  (10) Patent No.: US 8,694,512 B1
Zhdanovich et al.  (45) Date of Patent: Apr. 8, 2014

(54) QUERY SUGGESTIONS

(75) Inventors: Matsvei Zhdanovich, Zurich (CH); Radu Jurca, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/298,017

(22) Filed: Nov. 16, 2011

Related U.S. Application Data

(60) Provisional application No. 61/414,387, filed on Nov. 16, 2010.

(51) Int. Cl.
*G06F 17/30* (2006.01)

(52) U.S. Cl.
USPC .......................................................... 707/748

(58) Field of Classification Search
USPC .......................................................... 707/748
See application file for complete search history.

(56) References Cited

U.S. PATENT DOCUMENTS

2009/0019028 A1* 1/2009 Norris et al. ....................... 707/5
2011/0258212 A1* 10/2011 Lu et al. ......................... 707/760

* cited by examiner

*Primary Examiner* — Belix M Ortiz Ditren
(74) *Attorney, Agent, or Firm* — Bracewell & Giuliani LLP (57) ABSTRACT

Methods, systems, and apparatus, including computer programs encoded on a computer storage medium, for provided expanded geographical query suggestions. In one aspect, a method includes receiving one or more characters input into a user interface. A node in a graph is identified based on the one or more received characters, in which the node represents an entity having a name whose prefix contains the one or more received characters. A candidate node is identified in the graph that is related to the identified node, wherein the candidate node represents an entity having a name whose prefix does not contain the one or more received characters. The name of the entity represented by the candidate node is provided as an expanded query suggestion.

18 Claims, 5 Drawing Sheets

QUERY SUGGESTIONS

CROSS-REFERENCE TO RELATED APPLICATIONS

This application claims the benefit under 35 U.S.C. §119 (e) of U.S. Provisional Application Ser. No. 61/414,387, filed on Nov. 16, 2010, the entirety of which is hereby incorporated by reference.

BACKGROUND

This specification relates to digital information processing and, in particular, to generating query suggestions.

Interactive geographic maps can be viewed in web browsers and other software. A user can view an interactive geographic map for a desired location which can include information pertaining to surrounding businesses, business addresses, contact information, and driving directions, for example. Some interactive maps allow users to manipulate the maps to view adjacent sections, zoom in or out, or view satellite images of their desired location.

Interactive mapping systems may provide query suggestions in response to received queries. Query suggestions may be provided as a user types each letter of the query, rather than after the entire query has been submitted.

SUMMARY

This specification describes technologies relating to providing geographical query suggestions.

In general, one innovative aspect of the subject matter described in this specification can be embodied in methods that include the actions of receiving one or more characters input into a user interface; identifying a node in a graph based on the one or more received characters, in which the node represents an entity having a name whose prefix contains the one or more received characters; identifying a candidate node in the graph that is related to the identified node, wherein the candidate node represents an entity having a name whose prefix does not contain the one or more received characters; and providing the name of the entity represented by the candidate node as an expanded query suggestion. Other embodiments of this aspect include corresponding systems, apparatus, and computer programs, configured to perform the actions of the methods, encoded on computer storage devices.

These and other embodiments can each optionally include one or more of the following features. Identifying a candidate node in the graph includes identifying a plurality of candidate nodes in the graph, wherein each candidate node is related to the identified node and represents an entity having a name whose prefix does not contain the one or more received characters, and the method further includes the actions of calculating a suggestion score for each of the two or more candidate nodes; ranking the two or more candidate nodes based on the suggestion score; and providing a ranked list of names of entities represented by one or more highest ranking candidate nodes as expanded query suggestions. The plurality of candidate nodes is filtered by calculating a geographic proximity of a particular candidate node of the plurality of candidate nodes to the geographic region presented in a viewport; and removing the particular candidate node from the plurality of candidate nodes if the geographic proximity is greater than a threshold. The plurality of candidate nodes is filtered by removing a particular candidate node from the plurality of candidate nodes if a geographic feature associated with the particular candidate node is larger than a geographic feature associated with the identified node that is related to the particular candidate node. Identifying a candidate node in the graph that is related to the identified node includes identifying a node in the graph having a containment relationship with the identified node in the graph. Identifying a candidate node in the graph that is related to the identified node includes identifying a node in the graph having a proximity relationship with the identified node in the graph. Identifying a candidate node in the graph that is related to the identified node includes identifying a node in the graph having a category/entity relationship with the identified node in the graph. Identifying a candidate node in the graph that is related to the identified node includes identifying a node in the graph having a category/subcategory relationship with the identified node in the graph. Identifying a node in a graph based on the one or more received characters includes identifying a node in a trie structure corresponding to the one or more received characters, wherein the node in the trie structure is associated with the node in the graph.

Another innovative aspect of the subject matter described in this specification can be embodied in methods that include the actions of receiving in a query input field a sequence of one or more characters; using the sequence of one or more characters to identify a first node in a graph, wherein the first node in the graph represents a first entity and is associated with a name of the first entity, wherein the sequence of one or more characters is a prefix of the name associated with the first node; identifying, in the graph, a second node that is related to the first node, wherein the second node represents a second entity and is associated with a name of the second entity, and wherein the sequence of one or more characters is not a prefix of the name associated with the second node; and providing the name associated with the second node as a query suggestion. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Suggesting expanded geographical queries decreases the number of characters that a user must type to retrieve information. Typing fewer characters in turn decreases the amount of time required to find a desired result. Suggested queries can offer context and disambiguation information. Suggested geographical queries can also provide exploratory information by indicating popular landmarks. Suggesting expanded geographical queries can also create a browsing experience in countries that use highly-structured addressing.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Client devices (e.g., data processing apparatus such as personal computers, smart phones, tablet computers, laptop computers, and so on) can request map data for a geographic region of interest. The region of interest can be defined by a viewport, for example, which can be an element of the interactive mapping system graphical user interface (GUI). The viewport can be different shapes, e.g., rectangular or square, and can present map data of a particular geographic region. In response to the request for map data, one or more service providers can send the client device map data, which may be in the form of an image. The client's web browser then displays the map data or image in the viewport of the GUI.

Map data can include map images, satellite images, business locations, popular landmarks, driving or walking directions, and vector graphics defining paths and regions. Map data can also include various layers of related data, such as a layer illustrating volcanoes in the Pacific Ocean.

Client devices can request map data by submitting queries. Interactive mapping systems can receive queries typed by users, for example, and provide map data responsive to received queries. An interactive mapping system can recognize queries of various types, such as names of geographic entities (e.g., cities or countries), specific locations (e.g., an address), or categories (e.g. "hotels"). The system can also recognize queries seeking directions (e.g., "from Madrid to Paris") or queries for layers of map data (e.g., "volcanoes in Pacific").

Interactive mapping systems may also provide expanded query suggestions in response to a partially submitted query. Expanded query suggestions may contain terms that were not referenced in the original query. Expanded query suggestions may be queries that the interactive mapping system identifies as likely to be relevant for a user based on what the user has already typed. For example, an expanded query suggestion can be a query for a geographic entity that is contained within a larger geographic entity indicated by the query so far. Generally speaking, geographic entities are features on a map, such as countries, cities, or landmarks. For example, in response to the partial query "berl," the system may suggest "Alexanderplatz, Berlin," a popular landmark in Berlin, Germany.

Figure 1:
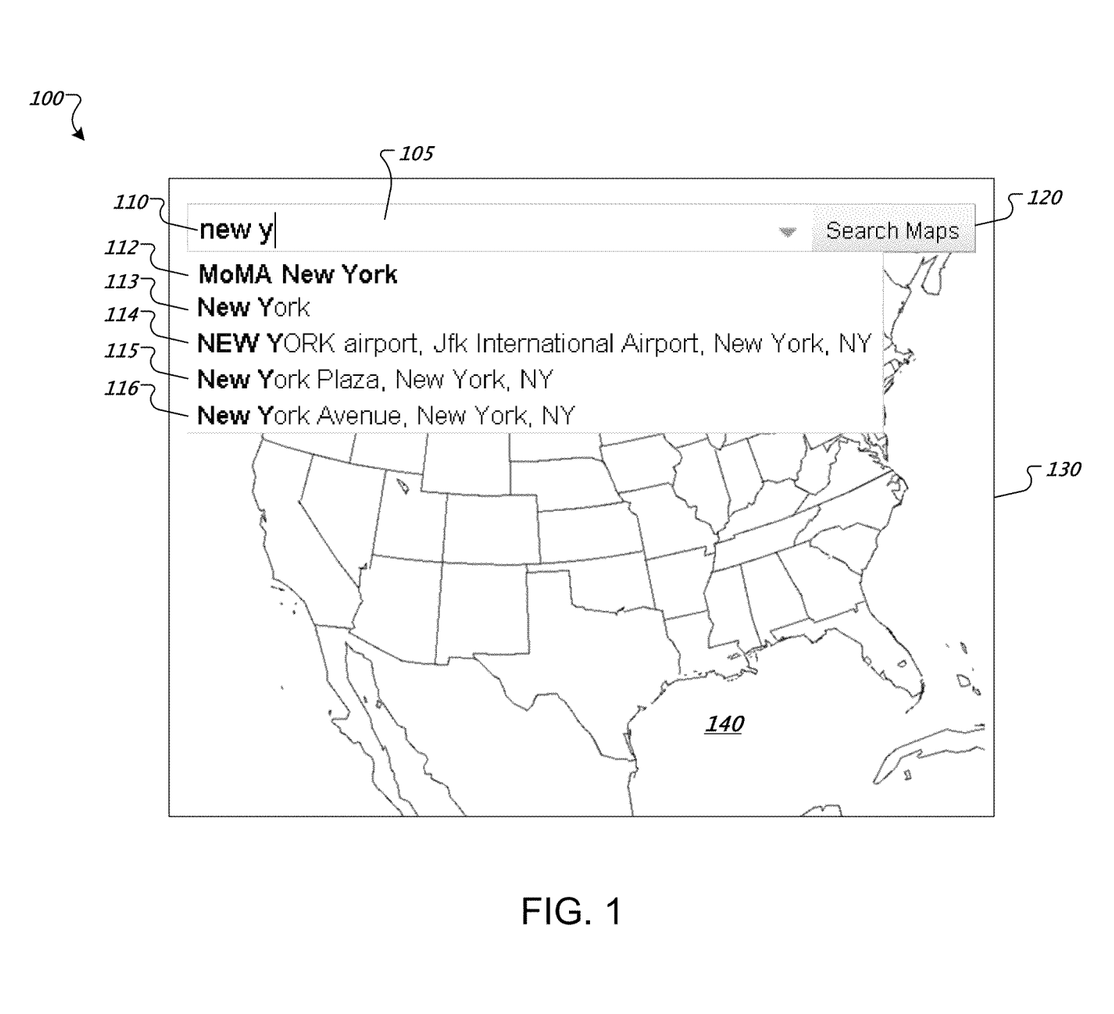
FIG. 1 is a diagram of an example graphical user interface for an interactive mapping system.

FIG. 1 is a diagram of an example graphical user interface 100 for an interactive mapping system. Users of the system can search for map data by submitting queries. In response to received queries, an interactive view mapping system provides map data in the form of map image.

A user of the interactive mapping system can enter a query 110 into a query box 105. By clicking a submit button 120, the interactive mapping system can retrieve map data 140 and present the map data 140 in a viewport 130. The viewport defines a range of current map coordinates to be displayed on the client device.

The interactive mapping system can also provide query suggestions, such as query suggestions 112, 113, 114, 115, and 116. In some implementations, a query suggestion is a potential completed query based on characters that the user has already typed (or spoken). For example, suggestion 113 ("New York") corresponds to a potential completed query ("New York") based on the query 110 that has already been typed ("new y"). Multiple potential completed queries are possible for any partial query. Other query suggestions are possible, including those described below.

The interactive mapping system can also provide expanded query suggestions. For example, in FIG. 1, the interactive mapping system identified "MoMA New York" (i.e. an abbreviation for "Museum of Modern Art") as an expanded query suggestion 112. This expanded query suggestion was provided because the suggestion is likely to be relevant to users searching for "New York," even though "MoMA" was not contained in the query 110. In other words, while regular query suggestions 113, 114, 115, 116 are queries that a user may have eventually typed, expanded query suggestion 112 is provided as a relevant suggestion even though, based on the partial query 110, the user could not have eventually typed "MoMA New York."

In some implementations, expanded query suggestions are related to the original queries in certain ways. For example, an expanded query suggestion may be a name of a geographic entity contained within a region whose name was identified by the original query or a potential completed query. For example, the Museum of Modern Art in New York City is contained within a region with a name matching the potential completed query "New York." As a result, "MoMA New York" is suggested for the partial original query "new y."

Figure 2:
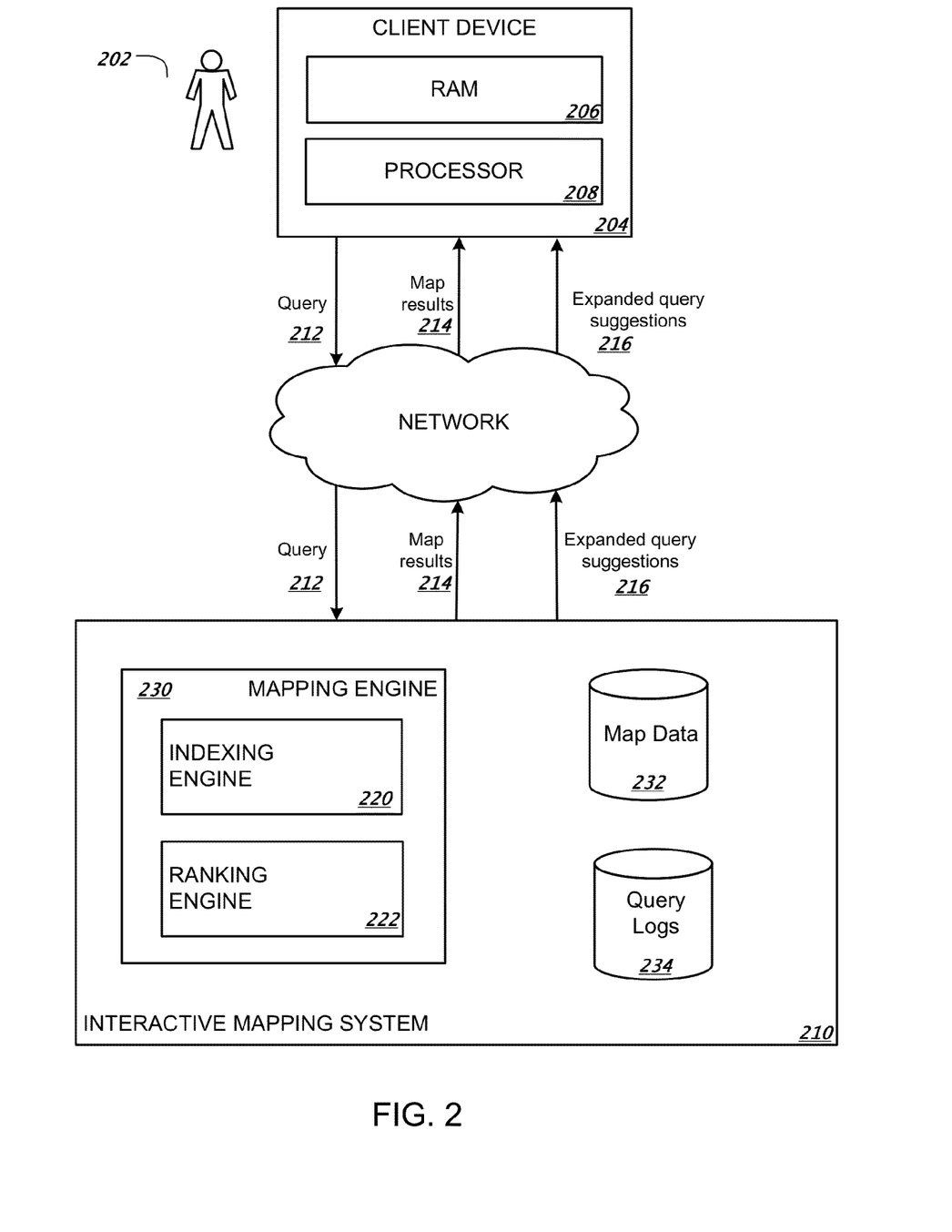
FIG. 2 shows an example interactive mapping system.

FIG. 2 shows an example interactive mapping system 210. The interactive mapping system 210 can provide map data relevant to submitted queries as can be implemented in an internet, an intranet, or another client and server environment. The interactive mapping system 210 is an example of an information retrieval system in which the systems, components, and techniques described below can be implemented.

A user 202 can interact with the interactive mapping system 210 through a client device 204. For example, the client 204 can be a computer coupled to the interactive mapping system through a local area network (LAN) or wide area network (WAN), e.g., the Internet. The client device 204 will generally include a random access memory (RAM) 206 and a processor 208.

A user 202 can submit a query 212 to a mapping engine 230 within an interactive mapping system 210. When the user 202 submits a query 212, the query 212 is transmitted through a network to the interactive mapping system 210. The interactive mapping system 210 can be implemented as, for example, computer programs running on one or more computers in one or more locations that are coupled to each other through a network. The interactive mapping system 210 includes a mapping engine 230. The interactive mapping system 210 responds to the query 212 by generating map results 214, which are transmitted through the network to the client device 204 in a form that can be presented to the user 202 (e.g., as an interactive mapping system web page to be displayed in a web browser running on the client device 204).

The interactive mapping system 210 also provides query suggestions 216, which are also transmitted through the network to the client device 204. Query suggestions 216 can include expanded query suggestions, which may contain terms that were not indicated by the original query.

When the query 212 is received by the interactive mapping system 210, the mapping 230 identifies map results 214 that correspond to the query 212. Map results can be retrieved from a corpus of map data 232. The map data 232 can be stored in various data structures, such as directed graphs and tries. An indexing engine 230 can index the potentially multiple names of entities contained in the corpus of map data 232.

Received queries can be stored in query logs 234. The query logs can be parsed by the indexing engine 220 to determine queries frequently submitted by users. The query log data can be anonymized before it is stored or used so that personally identifiable data is removed. For example, a user's identity may be anonymized so that no personally identifiable information can be determined for the user, and the data, if compromised, cannot be associated with a particular user or user identifier.

Figure 3:
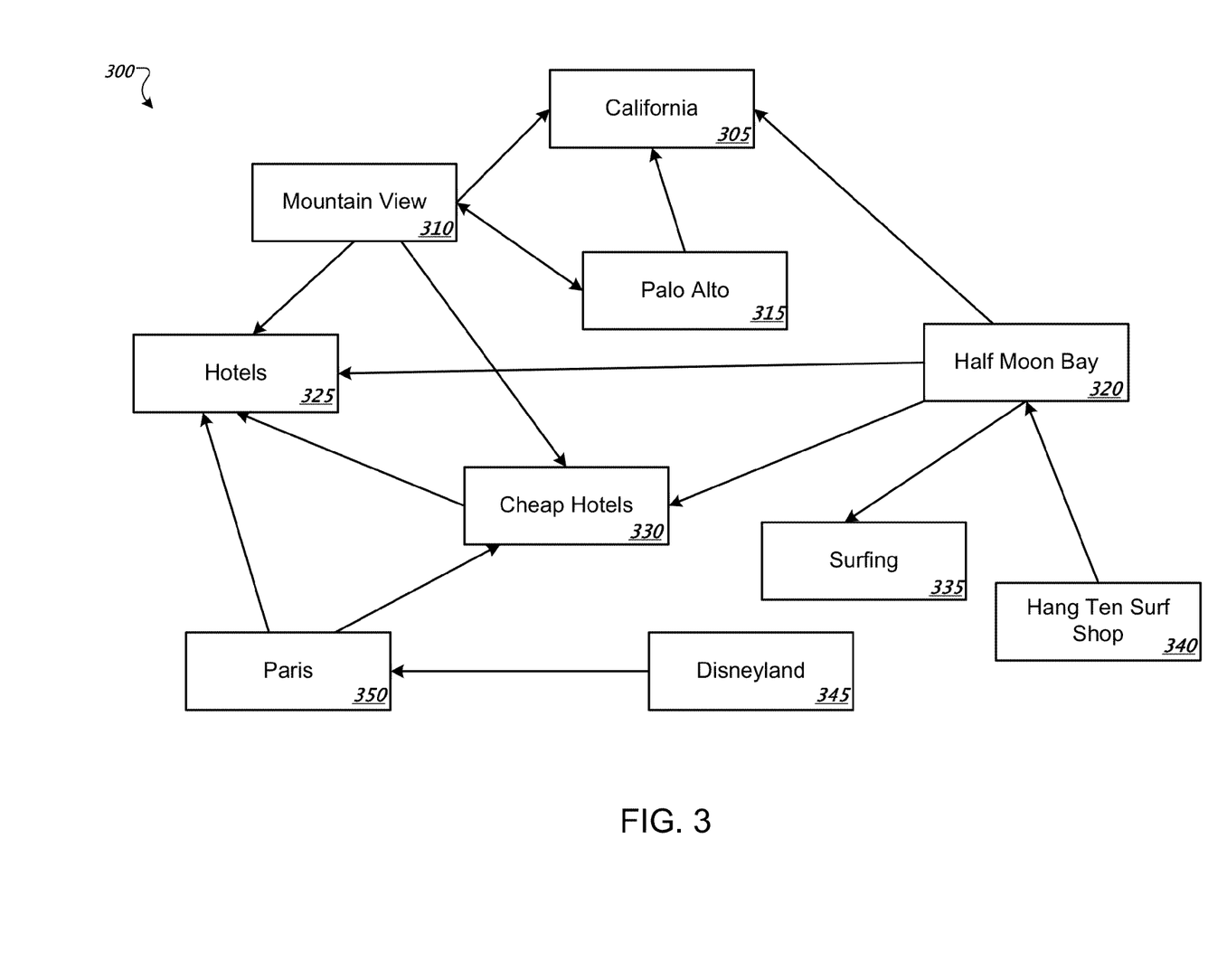
FIG. 3 is a diagram of an example directed graph for storing entities.

FIG. 3 is a diagram of a directed graph 300 for storing entities. A graph of entities 300 as shown by FIG. 3 can be used by an interactive mapping system, e.g., the interactive mapping system 210 of FIG. 2. Each node in the graph 300 represents an entity stored by the interactive mapping system.

Entities can include entities such as countries, cities, mountains, regions, neighborhoods, streets, roads, bridges, buildings, lakes, parks, airports, etc. Entities can also include specific locations such as businesses, landmarks, points of interest, subway stops, and bus stops. Entities can also include category and subcategory entities, such as "hotels," "cheap hotels," "restaurants," "best restaurants," "doctors," etc.

A link in the graph 300 indicates that two entities represented by the connected nodes are related. Entities can be related in various ways. Nodes in the graph may be associated with multiple names. For example, a node in the graph may contain both the names "New York" (in English) and "Nueva York" (in Spanish). Another example is node 340 representing the business "Hang Ten Surf Shop." Names associated with this node may include "Hang Ten Surf Shop," "Hang Ten Surf Shop, Half Moon Bay, Calif.," and "123 Main St., Half Moon Bay, Calif."

One relation between nodes in a graph of entities is a containment relationship. For example, node 310 ("Mountain View") and node 305 ("California") are linked in the graph because they have a containment relationship, since the entity corresponding to "Mountain View" (i.e. the city of Mountain View, Calif.) is geographically contained within the region of the entity corresponding to "California" (i.e. the State of California).

Another relation between nodes in a graph of entities is a proximity relationship. For example, node 310 (storing the name "Mountain View") and node 315 (storing the name "Palo Alto") are linked in the graph because they have a proximity relationship. Nodes 310 and 315 have a proximity relationship because the entity corresponding to "Mountain View" (i.e. the city of Mountain View, Calif.) is physically proximate to the entity corresponding to "Palo Alto" (i.e. the city of Palo Alto, Calif.). Proximity can be measured by the physical distance between two entities. Two nodes may be linked by proximity if the physical distance between their corresponding entities meets a proximity threshold. Node 315 ("Palo Alto") also shares a containment relationship with node 305 ("California"). The proximity threshold may depend upon the type of entities whose nodes being linked in the graph. For example, the proximity threshold between two streets may be smaller than the proximity threshold between two cities. Some nodes in a graph may not be able to share a proximity relationship because they have no associated geographic location. An entity node such as node 325 (storing "hotels") is not associated with a geographic location, and therefore may not share a proximity relationship with any other node.

Another relation between nodes in a graph of entities is a category relationship. For example, two nodes may be linked if one node is a business category and another node represents an entity that contains businesses of the business category. Node 325 ("hotels") and node 310 ("Mountain View") are linked in the graph because the entity corresponding to "Mountain View" contains businesses of the category corresponding to node 325 (i.e. hotels). In some implementations, the number or density of businesses of the specified business type must meet a threshold before two nodes are linked with a category relationship. This threshold requirement may distinguish a business category relationship from a containment relationship. Another category relationship may include a popular activity category. For example, node 320 ("Half Moon Bay") and node 335 ("Surfing") are linked in the graph because node 335 identifies a category of a popular activity in the geographic location corresponding to node 320 (i.e. Half Moon Bay, Calif.).

Another relation between nodes in a graph of entities is a category/subcategory relationship. For example, node 325 ("Hotels") and node 330 ("Cheap Hotels") are linked in the graph because "cheap hotels" is a subcategory of "hotels."

Other relations between nodes in the graph may be added based on submitted user queries. These user queries can be retrieved from query logs. Data stored in query logs can be anonymized so that it cannot be associated with any particular user.

Node 350 ("Paris") and node 345 ("Disneyland") is an example relation identified from query log data. In this example, the Disneyland Paris resort (located in Marne-la-Vallée, France) may neither be located within Paris, France, (to satisfy a containment relationship) nor be physically proximate enough to Paris, France to satisfy a proximity relationship. However, "Disneyland Paris" may be a popular query identified in the query logs. Accordingly, a link is created between node 350 and node 345. Additional popular activity nodes, such as node 335 and associated locations may also be identified from user query logs.

Figure 4:
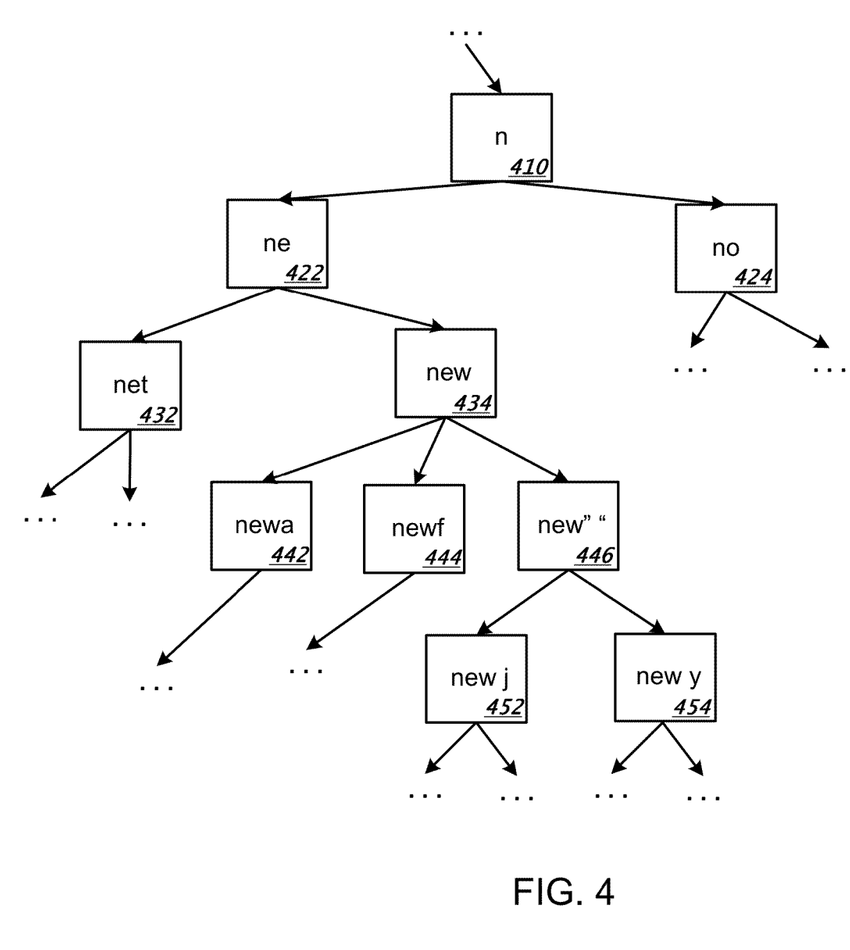
FIG. 4 is a diagram of an example trie used to store prefixes.

FIG. 4 is a diagram of a trie used to store prefixes. A trie is a tree data structure that can be used to store prefix data. Each node in the trie stores a string such that descendant nodes begin with the string stored in their parent nodes. Each node can have an arbitrary number of descendant nodes. Although indexing prefixes will be described as using a trie, other data structures can also be used for indexing.

An interactive mapping system can store entity names in a trie and associate corresponding nodes of the graph with respective nodes of the trie. The trie is then traversed as successive characters of an input query are received. Entities associated with nodes of the trie are identified. Links from each graph node associated with the trie node are followed to identify candidates for query suggestions.

Node 410 of the trie contains a string with a single character, "n." In response to a first input character "n," the trie is traversed to node 410. In some implementations, the root node of the trie contains an empty string. Node 410 can be associated with all graph nodes corresponding to entities with names beginning with "n".

In response to a second input character, the appropriate trie can be traversed to the appropriate descendant node. A second input character of "e" will result in the trie being traversed to node 422. A second input character of "o" will result in the trie being traversed to node 424. Node 422 ("ne") can be associated with all graph nodes corresponding to entities with names beginning with "ne." For example, the graph node containing the name "New York" can be associated with trie node 422. The graph node containing the name "New York" will not be associated with trie node 424.

Nodes in each successive level of the trie will be associated with fewer graph nodes than their parent nodes. For the query string "NewYork", the trie will be traversed from node 410, to node 422, to node 434, to node 446, and to node 454. Nodes 432, 442, 444, and 452 may not be associated with the graph node containing the name "New York."

Figure 5:
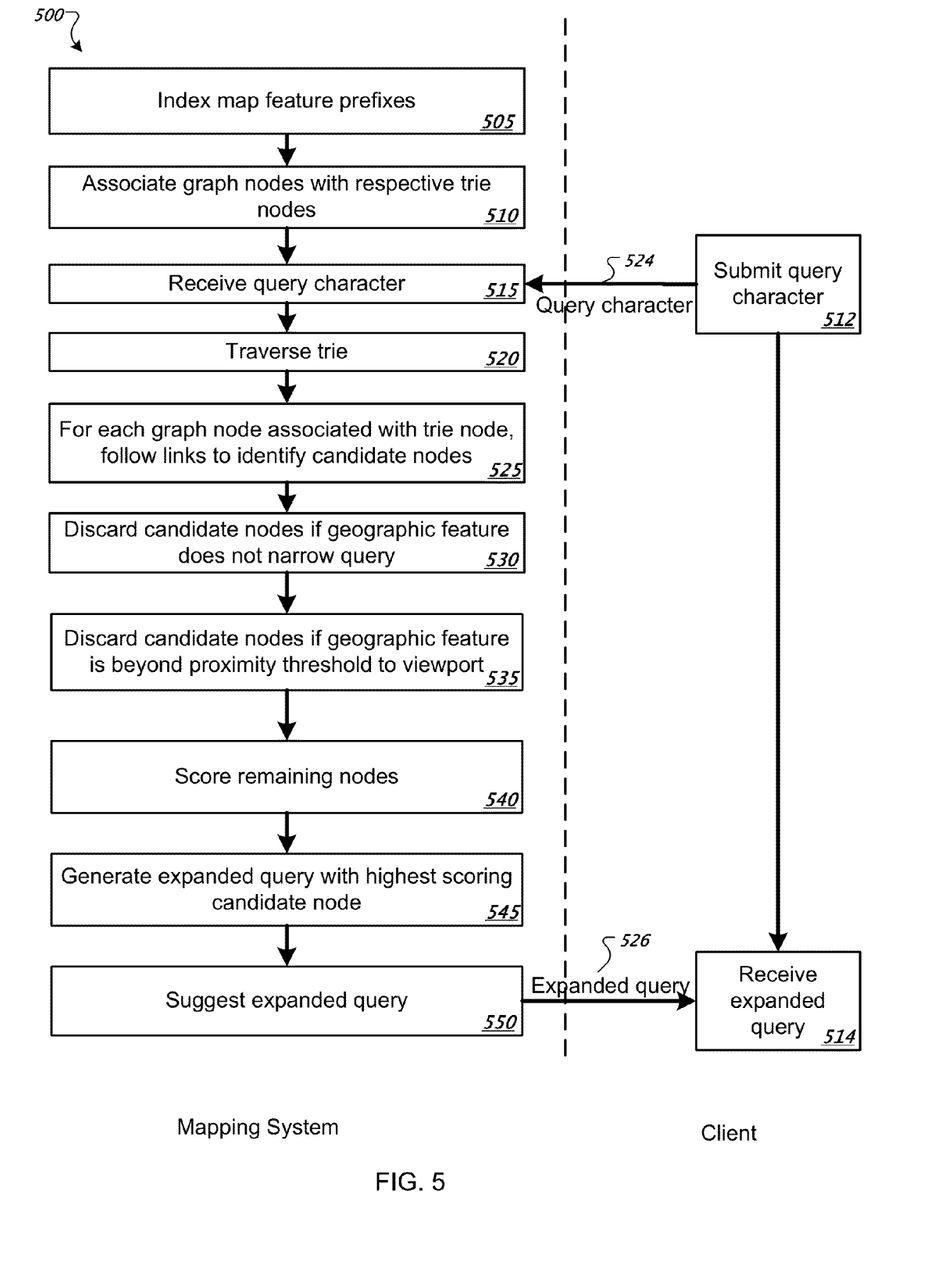
FIG. 5 is a sequence diagram of an example process for providing expanded query suggestions.

FIG. 5 is a sequence diagram of an example process 500 for providing expanded query suggestions. Expanded query suggestions can be provided in response to each input character of a received query. Expanded query suggestions may contain terms that are not referenced in either the original query or in a completed version of the original query. For example, "MoMA New York" may be provided as an expanded suggestion for the received query "new y." The process will be described as being performed by a computer system that includes one or more computers, e.g., an interactive mapping system described above. The process will be described as interacting with a client device, e.g., client device 204 in FIG. 2.

The system indexes prefixes of all map features in a trie (505). As described above, graph nodes may be associated with multiple names. For each name associated with each graph node, all prefixes of that name are indexed into the trie. For example, if a graph node is associated with the entity name "New York," the following prefixes will be indexed in the trie: "n," "ne," "new," "new," new y," "new yo," "new yor," and "new york." Each prefix will be indexed in the trie as set forth above with respect to FIG. 4.

The system associates graph nodes with trie nodes storing prefixes of respective entity names (510). For example, the graph node corresponding to the name "New York" will be associated with each node of the trie storing each prefix for "New York."

A client device submits a query character 524 (512), and the system receives a query character 524 from a client device (515). A query character may be submitted by a user of an interactive mapping system.

The system traverses the trie (520). Further levels of the trie are traversed for each successive query character received. In other words, the trie may only be traversed down a single level for each single character received. If the system has received characters "ne," the system will traverse the trie one more level in response to receiving the query character "w."

For each graph node associated with the current trie node, the system follows links to other graph nodes to identify candidate nodes (525). As set forth above, links in the graph represent various types of relations between nodes in the graph corresponding to various entities. By following links from each graph node to other nodes, the system can identify entities that are candidates for expanded query suggestions.

The system discards candidate nodes that do not narrow the query (530). Expanded query suggestions may not be relevant if they do not narrow the scope of a query. For example, if the query received is "mountain v," the graph node corresponding to "Mountain View" may be identified by traversing the trie. Following the links from the "Mountain View" graph node may identify a node for "United States." However, for a user searching for "Mountain View," a suggestion for "United States" may not be relevant because it does not narrow the query. Similarly, a query for "best h" may identify a graph node corresponding to "best hotels." Following the links from the "best hotels" graph node may identify a graph node corresponding to "hotels." However, for a user searching for "best hotels," a suggestion for "hotels" generally may not be relevant because it does not narrow the query.

The system discards remaining identified candidate nodes if the entity corresponding to the node is beyond a proximity threshold to the viewport of the interactive mapping system (530). For example, a current trie node storing the string "mountain v" can be associated with the graph node corresponding to "Mountain View." The graph node for "Mountain View" may have a link to the graph node corresponding to "Palo Alto." However, the current viewport may be focused on a region that is not proximate to Palo Alto, Calif., and thus this node can be discarded as a candidate.

In some implementations, graph links identified from query logs can override viewport proximity determinations. For example, query logs may indicate that queries for "Charles de Gaulle Airport" are common when the viewport is centered on Paris, France. Therefore, the system may identify "Charles de Gaulle Airport" as an expanded query suggestion, even though the graph node corresponding to "Charles de Gaulle Airport" may be beyond a proximity threshold to a viewport centered on Paris, France.

The system scores remaining candidate nodes (540). The scoring can be carried out in the same way for normal query suggestions and expanded query suggestions. In some implementations, the score is based on the probability P(f) that an entity will be mentioned in the query. For each feature f, the system calculates the cumulative probability of features related to f, or CPRF(f). The system calculates the score of a directly matched feature f1 and an expanded feature f2 as: score of f1 is P(f1), and the score of f2 is P(f1)*P(f2)/CPRF(f1).

An alternative approach to scoring mines probabilities from the query logs by calculating the number of times f1 appears after f2. The score of a suggestion f2 could then be calculated as P(f1)*P(f2|f1), where P(f2|f1) represents how often f2 appears after f1.

Additional scoring signals can also be used to score the remaining candidate nodes. A score of a candidate node may be decreased if the candidate node is outside a country indicated by the client device. A score of a candidate node may also be decreased if the name corresponding to the candidate node is in a language different from a language indicated by the client device.

The system generates an expanded query with the highest-scoring candidate node (545). The expanded query will include the name of the entity corresponding to the highest-scoring candidate node.

The system suggests the expanded query (550). The expanded query 526 is transmitted to the client device (550), and the client device receives the expanded query (514).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
    receiving one or more characters input into a user interface;
    identifying a node in a graph that represents an entity having a name comprising a prefix that contains the one or more received characters, the graph comprising nodes corresponding to entities and links indicative of relationships between nodes of the graph;
    identifying a candidate node in the graph that is related to the identified node based on one or more links between the candidate node and the identified node in the graph, and that represents an entity having a name comprising a prefix that does not contain the one or more received characters; and
    providing the name of the entity represented by the candidate node as an expanded query suggestion.

2. The method of claim 1, wherein identifying a candidate node in the graph comprises identifying a plurality of candidate nodes in the graph, wherein each candidate node is related to the identified node and represents an entity having a name comprising a prefix that does not contain the one or more received characters; further comprising:
    calculating a suggestion score for each of the two or more candidate nodes;
    ranking the two or more candidate nodes based on the suggestion score; and
    providing a ranked list of names of entities represented by one or more highest-ranking candidate nodes as expanded query suggestions.

3. The method of claim 2, further comprising filtering the plurality of candidate nodes by:
    calculating a geographic proximity of a particular candidate node of the plurality of candidate nodes to the geographic region presented in a viewport; and
    removing the particular candidate node from the plurality of candidate nodes if the geographic proximity is greater than a threshold.

4. The method of claim 2, further comprising filtering the plurality of candidate nodes by removing a particular candidate node from the plurality of candidate nodes if a geographic feature associated with the particular candidate node is larger than a geographic feature associated with the identified node that is related to the particular candidate node.

5. The method of claim 1, wherein identifying a candidate node in the graph that is related to the identified node comprises identifying a node in the graph having a containment relationship with the identified node in the graph.

6. The method of claim 1, wherein identifying a candidate node in the graph that is related to the identified node comprises identifying a node in the graph having a proximity relationship with the identified node in the graph.

7. The method of claim 1, wherein identifying a candidate node in the graph that is related to the identified node comprises identifying a node in the graph having a category/entity relationship with the identified node in the graph.

8. The method of claim 1, wherein identifying a candidate node in the graph that is related to the identified node comprises identifying a node in the graph having a category/subcategory relationship with the identified node in the graph.

9. The method of claim 1, wherein identifying a node in a graph based on the one or more received characters comprises:
    identifying a node in a trie structure corresponding to the one or more received characters, wherein the node in the trie structure is associated with the node in the graph.

10. A system comprising:
    one or more data processing apparatus and one or more storage devices storing instructions that are operable, when executed by the one or more data processing apparatus, to cause the one or more data processing apparatus to perform operations comprising:
        receiving one or more characters input into a user interface;
        identifying a node in a graph that represents an entity having a name comprising a prefix that contains the one or more received characters, the graph comprising nodes corresponding to entities and links indicative of relationships between nodes of the graph;
        identifying a candidate node in the graph that is related to the identified node based on one or more links between the candidate node and the identified node in the graph, and that represents an entity having a name comprising a prefix that does not contain the one or more received characters; and
        providing the name of the entity represented by the candidate node as an expanded query suggestion.

11. The system of claim 10, wherein identifying a candidate node in the graph comprises identifying a plurality of candidate nodes in the graph, wherein each candidate node is related to the identified node and represents an entity having a name comprising a prefix that does not contain the one or more received characters; further comprising:
    calculating a suggestion score for each of the two or more candidate nodes;
    ranking the two or more candidate nodes based on the suggestion score; and
    providing a ranked list of names of entities represented by one or more highest-ranking candidate nodes as expanded query suggestions.

12. The system of claim 11, wherein the operations further comprise filtering the plurality of candidate nodes by:

calculating a geographic proximity of a particular candidate node of the plurality of candidate nodes to the geographic region presented in a viewport; and removing the particular candidate node from the plurality of candidate nodes if the geographic proximity is greater than a threshold.

13. The system of claim 11, wherein the operations further comprise filtering the plurality of candidate nodes by removing a particular candidate node from the plurality of candidate nodes if a geographic feature associated with the particular candidate node is larger than a geographic feature associated with the identified node that is related to the particular candidate node.

14. The system of claim 10, wherein identifying a candidate node in the graph that is related to the identified node comprises identifying a node in the graph having a containment relationship with the identified node in the graph.

15. The system of claim 10, wherein identifying a candidate node in the graph that is related to the identified node comprises identifying a node in the graph having a proximity relationship with the identified node in the graph.

16. The system of claim 10, wherein identifying a candidate node in the graph that is related to the identified node comprises identifying a node in the graph having a category/entity relationship with the identified node in the graph.

17. The system of claim 10, wherein identifying a candidate node in the graph that is related to the identified node comprises identifying a node in the graph having a category/subcategory relationship with the identified node in the graph.

18. The system of claim 10, wherein identifying a node in a graph based on the one or more received characters comprises:

identifying a node in a trie structure corresponding to the one or more received characters, wherein the node in the trie structure is associated with the node in the graph.

* * * * *